United States Patent
Nakamura et al.

(10) Patent No.: US 8,044,758 B2
(45) Date of Patent: Oct. 25, 2011

(54) OPEN MAGNETIC CIRCUIT MULTILAYER COIL COMPONENT AND PROCESS FOR PRODUCING THE OPEN MAGNETIC CIRCUIT MULTILAYER COIL COMPONENT

(75) Inventors: Akihiro Nakamura, Shiga-ken (JP); Akiko Sato, Shiga-ken (JP); Yoichi Nakatsuji, Nagano-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 12/831,827

(22) Filed: Jul. 7, 2010

(65) Prior Publication Data
US 2010/0271163 A1   Oct. 28, 2010

Related U.S. Application Data

(63) Continuation of application No. PCT/JP2008/073727, filed on Dec. 26, 2008.

(30) Foreign Application Priority Data

Jan. 8, 2008   (JP) .................................. 2008-001362

(51) Int. Cl.
*H01F 5/00* (2006.01)
*H01F 7/06* (2006.01)

(52) U.S. Cl. ........ 336/200; 29/602.1; 336/232; 336/223

(58) Field of Classification Search .................. 336/200, 336/223, 232
See application file for complete search history.

(56) References Cited

U.S. PATENT DOCUMENTS

| | | | | |
|---|---|---|---|---|
| 6,459,351 | B1* | 10/2002 | Maki et al. ..................... | 336/200 |
| 6,597,270 | B2* | 7/2003 | Takashima et al. ............. | 336/83 |
| 6,715,197 | B2* | 4/2004 | Okuyama et al. ............ | 29/592.1 |
| 7,446,638 | B2* | 11/2008 | Nogi ............................. | 336/200 |
| 2002/0121957 | A1* | 9/2002 | Takashima et al. ........... | 336/200 |
| 2007/0069844 | A1* | 3/2007 | Kudo et al. .................... | 336/83 |
| 2008/0012679 | A1* | 1/2008 | Okabe et al. .................. | 336/200 |

FOREIGN PATENT DOCUMENTS

| | | |
|---|---|---|
| JP | 56-155516 | 12/1981 |
| JP | 05-326243 | 12/1993 |
| JP | 09-330819 A | 12/1997 |
| JP | 10-335131 | 12/1998 |
| JP | 2000-295057 A | 10/2000 |
| JP | 2001-044016 A | 2/2001 |

(Continued)

OTHER PUBLICATIONS

International Search Report; PCT/JP2008/073727; Apr. 7, 2009.

(Continued)

*Primary Examiner* — Anh Mai
(74) *Attorney, Agent, or Firm* — Studebaker & Brackett PC; Tim L. Brackett, Jr.

(57) ABSTRACT

An open magnetic circuit multilayer coil component includes a laminate with magnetic layers, a coil, and a nonmagnetic layer provided within the laminate so as to cross a magnetic path formed by energization of the coil. A nonmagnetic material constituting the nonmagnetic layer is a Zn—Cu-based ferrite nonmagnetic material, and a magnetic material constituting the magnetic layer is a magnetic material containing 100 parts by weight of an Ni—Zn—Cu-based magnetic ferrite material and 0.1 to 2.0 parts by weight, in terms of $Co_3O_4$, of Co added to the Ni—Zn—Cu-based magnetic ferrite material.

18 Claims, 3 Drawing Sheets

FOREIGN PATENT DOCUMENTS

| | | |
|---|---|---|
| JP | 2002-083708 A | 3/2002 |
| JP | 2002-134312 A | 5/2002 |
| JP | 2002-255637 A | 9/2002 |
| JP | 2004-311944 A | 11/2004 |
| JP | 2005-259774 A | 9/2005 |
| JP | 2006-206347 A | 8/2006 |
| JP | 2006-581573 | * 8/2010 |

OTHER PUBLICATIONS

K. Migita; "Written Opinion of the International Searching Authority"; PCT/JP20081073727; Apr. 7, 2009.

* cited by examiner

OPEN MAGNETIC CIRCUIT MULTILAYER COIL COMPONENT AND PROCESS FOR PRODUCING THE OPEN MAGNETIC CIRCUIT MULTILAYER COIL COMPONENT

CROSS REFERENCE TO RELATED APPLICATION

The present application is a continuation of International Application No. PCT/JP2008/073727 filed Dec. 26, 2008, which claims priority to Japanese Patent Application No. 2008-001362 filed Jan. 8, 2008, the entire contents of each of these applications being incorporated herein by reference in their entirety.

FIELD OF THE INVENTION

The present invention relates to a multilayer coil component such as a multilayer inductor, and more particularly, relates to an open magnetic circuit multilayer coil component which has a structure with a coil conductor provided within a laminate formed by stacking a magnetic layer and a nonmagnetic layer, and a process for producing the open magnetic circuit multilayer coil component.

BACKGROUND

Multilayer coil components suitable for reduction in size have been widely used in recent years. These components have a structure formed by stacking a plurality of conductor patterns for a coil and a plurality of magnetic layers with a coil conductor provided in the laminate.

Among these multilayer coil components, closed magnetic circuit multilayer coil components have a problem that when a superimposed direct current is gradually increased, the inductance is substantially constant or gently decreased up to a certain current value, while beyond the current value, magnetic saturation is caused to rapidly decrease the inductance.

Thus, in order to remedy this problem, it has been known that multilayer coil components are made to have an open magnetic circuit by inserting a nonmagnetic layer near the center of a coil in the stacking direction of a laminate composed of stacked magnetic layers.

As such open magnetic circuit multilayer coil components, Japanese Patent Application Laid-Open No. 2004-311944 (Patent Document 1) proposes a multilayer coil component in which a nonmagnetic layer (an insulating layer) composed of $B_2O_3$—$SiO_2$-based glass or $Al_2O_3$—$SiO_2$-based glass is inserted between magnetic layers composed of an Ni—Zn—Cu—based ferrite material.

However, the shrinking behavior during firing is different between the Ni—Zn—Cu-based ferrite material and the $B_2O_3$—$SiO_2$-based glass or $Al_2O_3$—$SiO_2$-based glass, leading to a problem that defects such as cracks are likely to occur.

In addition, Japanese Patent Application Laid-Open No. 2005-259774 proposes an open magnetic circuit multilayer coil component in which a nonmagnetic layer composed of a Zn—Cu-based nonmagnetic ferrite material is inserted between magnetic layers composed of an Ni—Zn—Cu-based ferrite material.

In the case of this open magnetic circuit multilayer coil component, there is no significant difference in shrinking behavior during firing between the nonmagnetic layer and the magnetic layer, thus allowing the occurrence of defects such as cracks to be suppressed. However, since the nonmagnetic layer contains no Ni, Ni is likely to be diffused from the magnetic layer to the nonmagnetic layer, leading to a problem that the temperature characteristics of inductance for the multilayer coil component is degraded due to the diffusion of Ni (the rate of inductance change with temperature is increased). In particular, when the thickness of the nonmagnetic layer is designed to be small, the open magnetic circuit multilayer coil component has a problem that the temperature characteristics of inductance are significantly degraded due to diffusion of Ni from the magnetic layer to the nonmagnetic layer. In an open magnetic circuit multilayer coil component, while it is preferable to reduce the thickness of the nonmagnetic layer as much as possible in order to increase the initial inductance, the temperature characteristics of inductance is actually significantly degraded when the thickness of the nonmagnetic layer is reduced to 40 µm or less.

SUMMARY

In one aspect, embodiments consistent with the claimed invention relate to an open magnetic circuit multilayer coil component having a laminate including a coil incorporated laminate section and an exterior section.

In the coil incorporated laminate section are staked a plurality of conductors for a coil and a plurality of magnetic layers containing a Ni—Zn—Cu-based ferrite material as their main constituent. The plurality of conductors for a coil are electrically connected to form a coil in the coil incorporated laminate section, and the exterior section has magnetic layers stacked on external sides of the coil incorporated laminate section in the stacking direction of the coil incorporated laminate section.

A nonmagnetic layer containing a Zn—Cu-based ferrite material is provided within the laminate so as to cross a magnetic path formed within the laminate by energization of the coil.

A magnetic material constituting the magnetic layers contains 100 parts by weight of the Ni—Zn—Cu-based ferrite material and 0.1 to 2.0 parts by weight of Co in terms of $Co_3O_4$ with respect to the Ni—Zn—Cu-based ferrite material.

According to a more specific exemplary embodiment, the magnetic material constituting the magnetic layers of the open magnetic circuit multilayer coil component may contain 100 parts by weight of the Ni—Zn—Cu-based ferrite material and 0.2 to 1.5 parts by weight of Co in terms of $Co_3O_4$ with respect to the Ni—Zn—Cu-based ferrite material.

According to another more specific exemplary embodiment, the nonmagnetic layer of the open magnetic circuit multilayer coil component may be provided in a central region in the stacking direction of the laminate.

According to yet another more specific exemplary embodiment, the nonmagnetic layer of the open magnetic circuit multilayer coil component may have a positive temperature characteristics of magnetic permeability.

According to another more specific exemplary embodiment, the nonmagnetic layer of the open magnetic circuit multilayer coil component may be formed by firing a nonmagnetic ceramic green sheet, and may have a thickness of 10 to 40 µm at the stage of the nonmagnetic ceramic green sheet before the firing.

In another aspect, embodiments consistent with the claimed invention relate to a process for producing an open magnetic circuit multilayer coil component including a laminate including a coil incorporated laminate section and an exterior section. The coil incorporated laminate section includes a plurality of conductors for a coil stacked with a plurality of magnetic layers, the plurality of conductors for a coil are electrically connected to form a coil in the coil incorporated laminate section, and the exterior section is made of magnetic layers stacked on external sides of the coil incorporated laminate section in the stacking direction of the coil incorporated laminate section. The laminate includes a nonmagnetic layer contains a Zn—Cu-based ferrite material and is provided within the laminate so as to cross a magnetic path formed within the laminate by energization of the coil.

The process includes a step of preparing a magnetic ceramic green sheet containing a magnetic material as its main constituent. The magnetic material contains an Ni—Zn—Cu-based ferrite material and 0.1 to 2.0 parts by weight of Co in terms of $Co_3O_4$ with respect to 100 parts by weight of the Ni—Zn—Cu-based ferrite material, a coil forming magnetic ceramic green sheet with a conductor pattern for a coil formed on the magnetic ceramic green sheet, and a nonmagnetic ceramic green sheet containing a nonmagnetic material as its main constituent.

The process includes a step of forming an unfired laminate by stacking the magnetic ceramic green sheet, the coil forming magnetic ceramic green sheet, and the nonmagnetic ceramic green sheet.

The unfired laminate includes an unfired coil incorporated laminate section in which a plurality of conductor patterns for a coil and a plurality of magnetic ceramic green sheets are stacked.

The coil incorporated laminate section has therein a coil pattern formed by connecting the plurality of conductor patterns for the coil.

An unfired exterior section is made of magnetic ceramic green sheets provided on external sides in the stacking direction of the unfired coil incorporated laminate section.

A nonmagnetic ceramic green sheet is provided so as to be sandwiched between the coil forming magnetic ceramic green sheets constituting the unfired coil incorporated laminate section.

The process for producing an open magnetic circuit multilayer coil component includes the step of forming a pair of external electrode patterns on the unfired laminate, where the pair of external electrode patterns are connected at each end of the coil pattern.

The process for producing an open magnetic circuit multilayer coil component includes the step of firing the unfired laminate with the external electrode patterns formed.

According to a more specific exemplary embodiment, in the process for producing an open magnetic circuit multilayer coil component, the nonmagnetic ceramic green sheet may be provided in a central region in the stacking direction of the unfired laminate.

DETAILED DESCRIPTION

The features of the claimed inventions will be described below in more detail with reference to exemplary embodiments.

Figure 1:
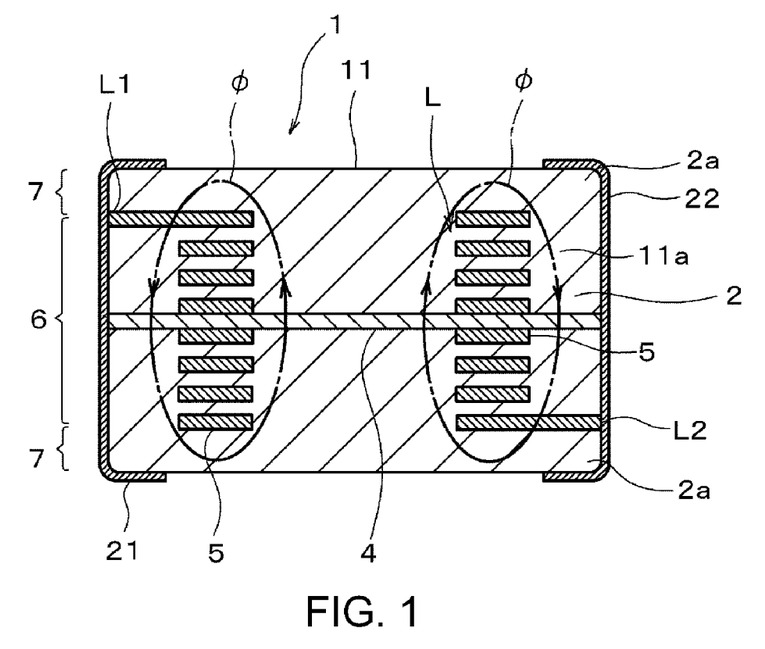
FIG. 1 is a front cross-sectional view illustrating the structure of an open magnetic circuit multilayer coil component according to an exemplary embodiment.
Figure 2:
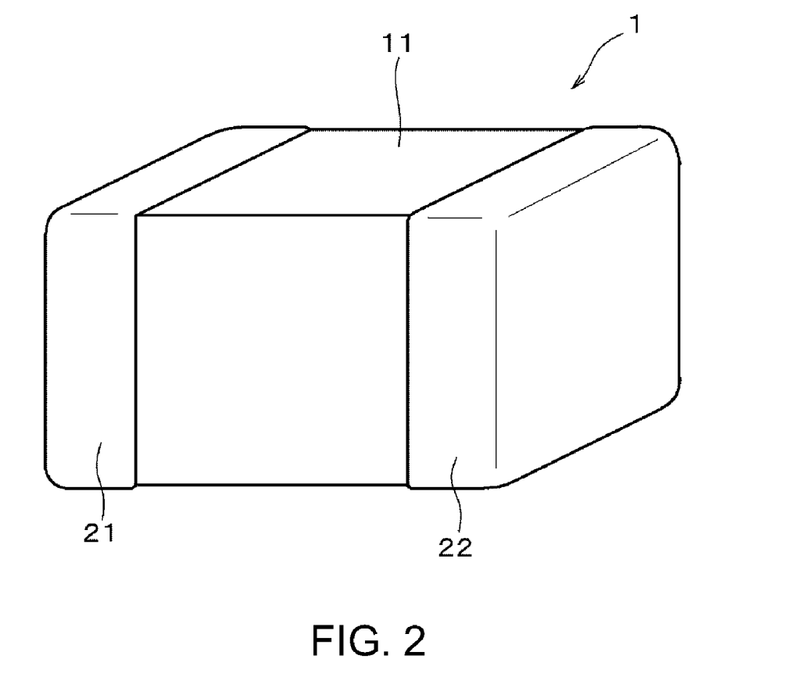
FIG. 2 is a perspective view illustrating the structure of the open magnetic circuit multilayer coil component shown in FIG. 1.
Figure 3:
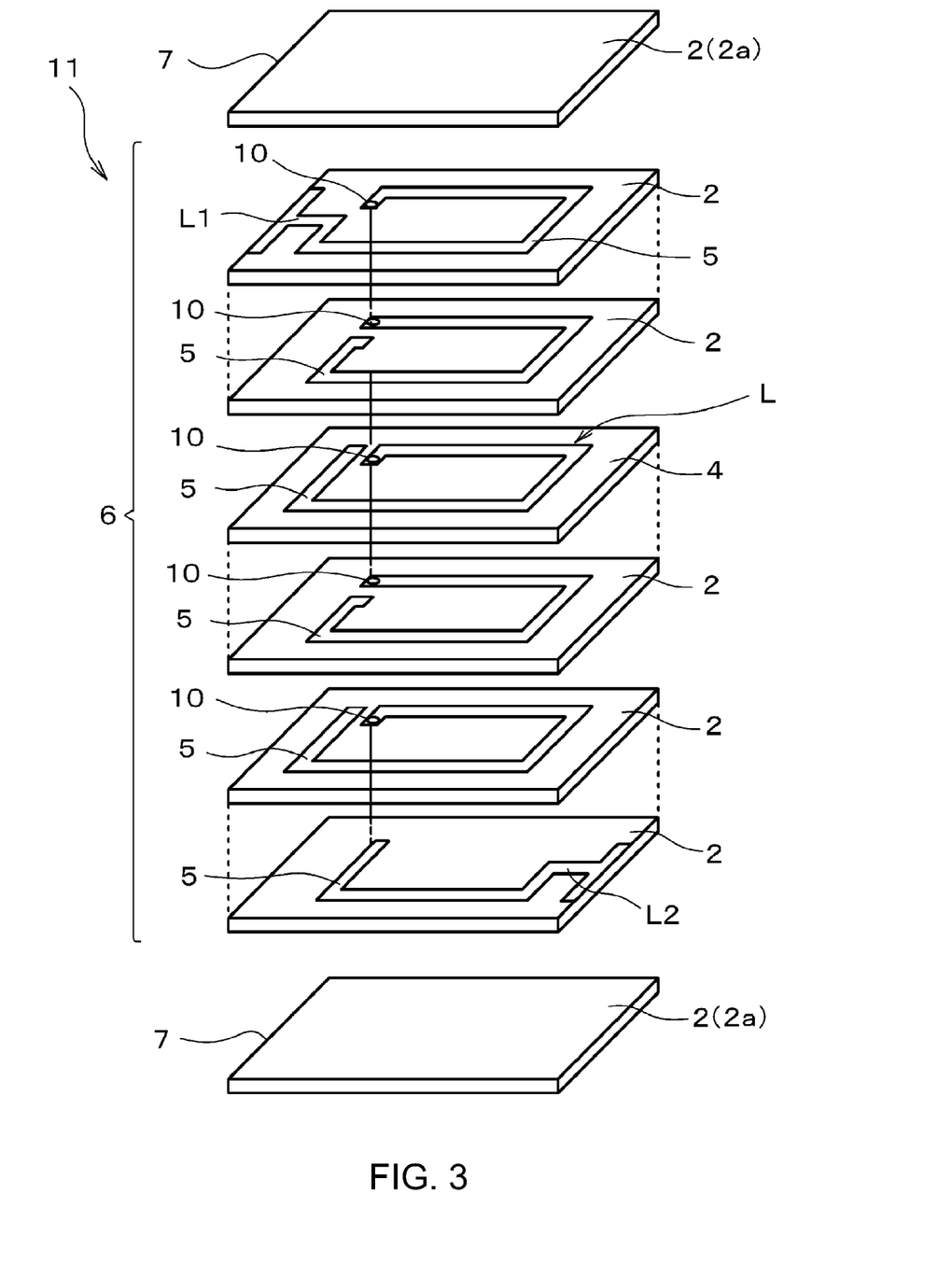
FIG. 3 is an exploded perspective view for explaining the internal structure of, and a process for producing an exemplary open magnetic circuit multilayer coil component.

FIG. 1 is a cross-sectional view illustrating the structure of an open magnetic circuit multilayer coil component 1 (e.g., a multilayer inductor) according to an exemplary embodiment, FIG. 2 is a perspective view of the exemplary open magnetic circuit multilayer coil component shown in FIG. 1, and FIG. 3 is an exploded perspective view for explaining the internal structure of and a process for producing the open magnetic circuit multilayer coil component, such as the components shown in FIGS. 1 and 2.

As shown in FIGS. 1 to 3, the open magnetic circuit multilayer coil component 1 according to the first exemplary embodiment is an open magnetic circuit multilayer inductor, which includes a laminate 11 formed by stacking a plurality of conductors 5 for a coil and a plurality of magnetic layers 2 (see FIG. 3) composed of an Ni—Zn—Cu-based ferrite material.

The laminate 11 includes a coil incorporated laminate section 6 incorporating a spiral coil L formed by electrically connecting the plurality of conductors for a coil provided between the plurality of magnetic layers 2 through a via hole conductor 10 for interlayer connection, and an exterior section 7 composed of magnetic layers 2 (2a) (see FIG. 3) stacked on the external sides (both top and bottom sides) in the stacking direction of the coil incorporated laminate section 6.

Furthermore, a nonmagnetic layer 4 composed of a Zn—Cu-based ferrite material is provided in a central region of the stacking direction of the coil incorporated laminate section 6 of the laminate 11 so as to cross a magnetic path (a magnetic flux) $\phi$ formed within the laminate 11 by energization of the coil L.

In addition, the ends of the laminate 11 are provided with external electrodes 21 and 22 provided to be electrically connected to ends L1 and L2 of the coil L.

Furthermore, in the open magnetic circuit multilayer coil component 1 according to the first exemplary method, a magnetic material containing 100 parts by weight of an Ni—Zn—Cu-based magnetic ferrite material and 0.1 to 2.0 parts by weight of Co in terms of $Co_3O_4$ with respect to the Ni—Zn—Cu-based magnetic ferrite material is used as a magnetic material constituting the magnetic layers 2 in the laminate 11.

In addition, the nonmagnetic layer 4 in the laminate 11 is formed by firing a nonmagnetic ceramic green sheet with a thickness of 10 to 40 μm. While the thickness of the nonmagnetic layer 4 is not actually measured, the nonmagnetic layer 4 is estimated to have a thickness of about 5 to 20 μm.

Next, a process for producing this open magnetic circuit multilayer coil component will be described with reference to FIGS. 1 to 3.

In a first exemplary method of manufacturing a magnetic ceramic green sheet, first, $Fe_2O_3$ powder, ZnO powder, NiO powder, CuO powder, and $Co_3O_4$ powder were prepared.

Then, the $Co_3O_4$ powder was added at ratios shown in Table 1 to 100 parts by weight of a magnetic raw material (an Ni—Zn—Cu-based ferrite material) containing the $Fe_2O_3$ powder, the ZnO powder, the NiO powder, and the CuO powder at the respective ratios of: $Fe_2O_3$: 48 mol %; ZnO: 28 mol %; NiO: 15 mol %, and CuO: 9 mol %, thereby obtaining a blended magnetic raw material. It is to be noted that the samples which have sample numbers with a symbol * in Table 1 are outside the scope of the present invention.

Then, this blended magnetic raw material was wet-mixed for 20 hours in a ball mill with zirconia balls as cobbled stones, thereby obtaining a slurry.

Then, this slurry was dried in a drier, and fired at 700° C. for 2 hours to obtain a fired matter. This fired matter was wet-ground in a ball mill for 20 hours, and after the completion of the grinding, a predetermined amount of a binder was added and mixed to obtain a ceramic slurry.

The obtained ceramic slurry was formed into a sheet by a doctor blade method, thereby obtaining ceramic green sheets (magnetic ceramic green sheets), for example, with a thickness of 25 μm.

Next, after forming a via hole in a predetermined position of the magnetic ceramic green sheet, an Ag paste composed of Ag powder, varnish, and a solvent was screen-printed on the surface of the ceramic green sheet to form a predetermined conductor pattern for a coil and a via hole conductor for interlayer connection.

It is to be noted that as the magnetic ceramic green sheets for the exterior section for forming the exterior section 7, the magnetic ceramic green sheets manufactured as described above were used directly without the formation of the conductor pattern for a coil or the via hole conductor for interlayer connection.

As shown in Table 1, a nonmagnetic raw material weighed to contain $Fe_2O_3$, ZnO, and CuO at respective ratios of 48 mol %, 43 mol %, and 9 mol % was wet-mixed in a ball mill for 48 hours, thereby obtaining a slurry.

This slurry was dried in a drier, and fired at 700° C. for 2 hours to obtain a fired matter. This fired matter was wet-ground in a ball mill for 16 hours, and after the completion of the grinding, a predetermined amount of a binder was added and mixed to obtain a ceramic slurry.

The obtained ceramic slurry was formed into a sheet, thereby obtaining a nonmagnetic ceramic green sheet with a thickness of 10 μm.

Next, after forming a via hole in a predetermined position, an Ag paste composed of Ag powder, varnish, and a solvent was screen-printed on the surface of the nonmagnetic ceramic green sheet to form a predetermined conductor pattern for a coil.

sheet (unfired magnetic layer) 4 were stacked in the predetermined order. The stacked sheets were subjected to pressure bonding at 1000 kgf/cm² to form an unfired laminate 11 including a coil incorporated laminate section 6, which includes a spiral coil L with the plurality of conductors 5 for a coil connected through a via hole conductor 10 for interlayer connection. The coil incorporated laminate section 6 also includes an exterior section 7 provided on the external sides in the stacking direction of the coil incorporated laminate section 6.

It is to be noted that the number of turns for the coil L was 9.5 turns in this example, although other embodiments can use more or less than 9.5 turns. In addition, as the nonmagnetic ceramic green sheet for forming the nonmagnetic layer 4, two sheets with an exemplary thickness of 10 μm were inserted to have a total thickness of 20 μm.

Then, after cutting the laminate 11 as a pressure-bonded block into a predetermined size, the binder was removed, and firing was carried out at 900° C. for 150 minutes, for example, to thereby obtain the sintered laminate 11 (see FIG. 1) provided therein with the spiral coil L.

Next, a conductive paste for the formation of external electrodes, which was composed of Ag powder, B—Si—K—O-based glass frit, varnish, and a solvent, for example, was applied to the ends of the sintered laminate 11, dried, and then baked at 750° C., thereby forming external electrodes 21 and 22 (see FIG. 1).

Thus, open magnetic circuit multilayer coil components 1 are obtained which have the structure as shown in FIGS. 1 to 3.

Then, the inductance at 1 MHz, and the temperature characteristics of inductance (i.e., the rate of inductance change with respect to the inductance at a base temperature of 25° C. (ΔL/L25° C. (%)) were measured for each open magnetic circuit multilayer coil component (sample) manufactured as described above. The results are shown in FIG. 4.

Figure 4:
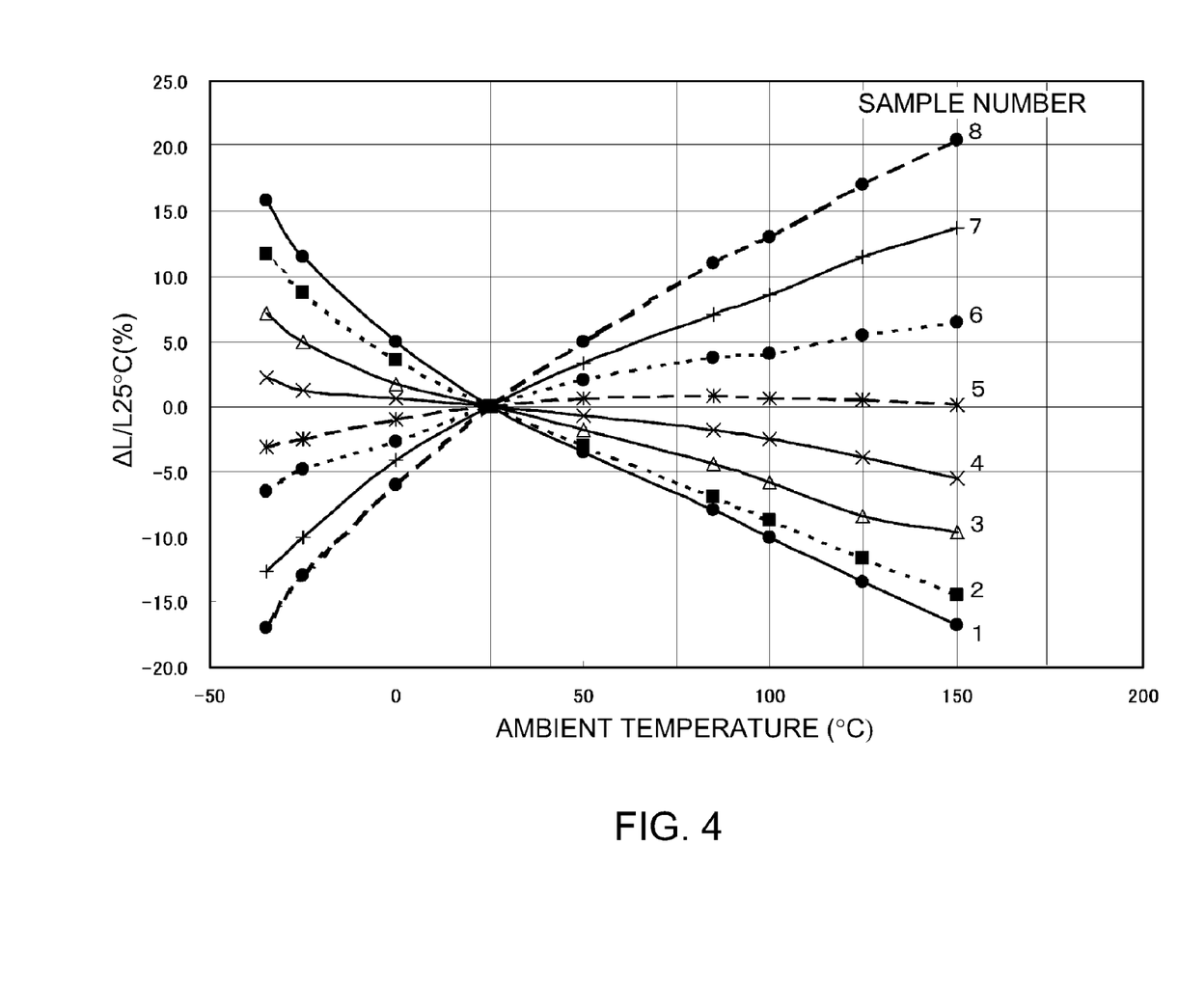
FIG. 4 is a graph showing measurement results of the inductance at 1 MHz and temperature characteristics of the inductance (the rate of inductance change with respect to the inductance at a base temperature of 25° C. ($\Delta L/L25°$ C. (%)), measured for samples according to exemplary embodiments and comparative examples.

As shown in FIG. 4, it has been confirmed that the inductance is increased at higher temperatures as the amount of $Co_3O_4$ added to the Ni—Zn—Cu-based ferrite material constituting the magnetic layers is increased, and that the tem-

TABLE 1

| Sample Number | Composition of Magnetic Layer | | | | | Composition of Nonmagnetic Layer | | |
|---|---|---|---|---|---|---|---|---|
| | $Fe_2O_3$ (mol %) | ZnO (mol %) | NiO (mol %) | CuO (mol %) | $Co_3O_4$ (parts by weight) | $Fe_2O_3$ (mol %) | ZnO (mol %) | CuO (mol %) |
| *1 | 48 | 28 | 15 | 9 | 0 | 48 | 43 | 9 |
| 2 | 48 | 28 | 15 | 9 | 0.1 | 48 | 43 | 9 |
| 3 | 48 | 28 | 15 | 9 | 0.2 | 48 | 43 | 9 |
| 4 | 48 | 28 | 15 | 9 | 0.5 | 48 | 43 | 9 |
| 5 | 48 | 28 | 15 | 9 | 1.0 | 48 | 43 | 9 |
| 6 | 48 | 28 | 15 | 9 | 1.5 | 48 | 43 | 9 |
| 7 | 48 | 28 | 15 | 9 | 2.0 | 48 | 43 | 9 |
| *8 | 48 | 28 | 15 | 9 | 2.5 | 48 | 43 | 9 |

In Table 1, "$CO_3O_4$ (parts by weight)" refers to the amount of $CO_3O_4$ powder added with respect to 100 parts by weight of a magnetic raw material (Ni—Zn—Cu-based ferrite material).

In an exemplary method of manufacturing an open circuit multilayer coil component according to an embodiment, as shown in FIG. 3, the magnetic ceramic green sheets (unfired magnetic layers) 2 with the conductor pattern for a coil (unfired conductors for coils) 5, the magnetic ceramic green sheets (unfired magnetic layers for exterior) 2a with no conductor pattern for a coil, and the nonmagnetic ceramic green perature characteristics of inductance (ΔL/L25° C. (%)) are allowed to be rendered within ±10% in the temperature range from −25 to 85° C. in the range of the $Co_3O_4$ additive amount from 0.1 to 2.0 parts by weight (sample numbers 2, 3, 4, 5, 6, and 7).

In addition, it has been confirmed that when the amount of $Co_3O_4$ added to 100 parts by weight of the Ni—Zn—Cu-based ferrite material constituting the magnetic layers is 0.2 to 1.5 parts by weight (the samples of sample numbers 3, 4, 5, and 6), the temperature characteristics of inductance (ΔL/

L25° C. (%)) are allowed to be reduced to within ±10% in a wide temperature range of −35 to 150° C., which is further preferable.

It is to be noted that when the amount of $Co_3O_4$ added to 100 parts by weight of the Ni—Zn—Cu-based ferrite material constituting the magnetic layers is less than 0.1 parts by weight (the sample of sample number 1), the temperature characteristics of the single magnetic layer will not be positive, and when the Ni—Zn—Cu-based ferrite material is combined with the Zn—Cu-based nonmagnetic ferrite material, the effect of improvement in the temperature characteristics will be insufficient, which is not preferable.

In addition, it has been confirmed that when the amount of $Co_3O_4$ added to the Ni—Zn—Cu-based ferrite material constituting the magnetic layers exceeds 2.0 parts by weight (the sample of sample number 8), the temperature characteristics of the single magnetic layer will be shifted too much in a positive direction, the rate of change ($\Delta L/L25°$ C. (%)) at +85° C. will exceed +10%, which is not preferable.

In a second exemplary method of manufacturing magnetic ceramic green sheet according to an embodiment, $Co_3O_4$ powder was blended at ratios as shown in Table 2, with 100 parts by weight of the magnetic raw material (Ni—Zn—Cu-based ferrite material) which has the same composition as in the case of first exemplary method described above, and magnetic ceramic green sheets were manufactured by the same method as in the case of the first exemplary method described above. It is to be noted that the samples which have sample numbers with a symbol * in Table 2 are outside the scope of the present invention.

Then, in the same way as in the case of the first exemplary method, after forming a via hole in a predetermined position, a predetermined conductor pattern for a coil and a via hole conductor for interlayer connection were formed on the surface of the magnetic ceramic green sheet.

It is to be noted that as the magnetic ceramic green sheets for the exterior section, the magnetic ceramic green sheets described above with no conductor pattern for a coil formed or no via hole conductor formed were used directly in the same way as in the case of the first exemplary method described above.

The same raw material as in the case of the first exemplary method described above was used to manufacture a nonmagnetic ceramic green sheet by the same method, and after forming a via hole in a predetermined position, a predetermined coil pattern was formed on the surface of this nonmagnetic ceramic green sheet.

A second exemplary method of manufacturing an open magnetic circuit multilayer coil component will now be described. In accordance with the same conditions and method as in the case of the first exemplary method described above, magnetic ceramic green sheets (unfired magnetic layers) with the conductor pattern for a coil (unfired conductor for a coil), magnetic ceramic green sheets (unfired magnetic layers for exterior) with no conductor pattern for a coil, and the nonmagnetic ceramic green sheet (unfired magnetic layer) were stacked, subjected to pressure bonding, cut, fired, and subjected to the formation of external electrodes to manufacture a multilayer coil component.

However, in the second exemplary method of manufacturing a magnetic ceramic green sheet, the thickness of the nonmagnetic layer provided in a central region in the coil incorporated laminate section of the laminate was adjusted so as to have thicknesses as shown in Table 2, by changing the number of inserted nonmagnetic ceramic green sheets with a thickness of 10 μm. It is to be noted that the thickness of the nonmagnetic layer in Table 2 refers to the thickness at the stage of the nonmagnetic ceramic green sheet before firing, and specifically, refers to the value obtained from the thickness of one nonmagnetic ceramic green sheet×the number of inserted sheets.

The inductance (L) at 1 MHz, and the temperature characteristics of inductance ($\Delta L/L25°$ C. (%)) were measured for each of the thus manufactured open magnetic circuit multilayer coil components (samples) with nonmagnetic layers different in thickness.

TABLE 2

| Sample Number | Magnetic Layer | | | | | Nonmagnetic Layer | | | |
|---|---|---|---|---|---|---|---|---|---|
| | Composition of Main Component (mol %) | | | | $Co_3O_4$ Additive Amount/ parts by weight | Composition of Main Component (mol %) | | | Thickness of Nonmagnetic Layer as Sheet (μm) |
| | $Fe_2O_3$ | ZnO | NiO | CuO | | $Fe_2O_3$ | ZnO | CuO | |
| *9 | 48 | 28 | 15 | 9 | 0 | 48 | 43 | 9 | 0 |
| *10 | 48 | 28 | 15 | 9 | 0 | 48 | 43 | 9 | 20 |
| *11 | 48 | 28 | 15 | 9 | 0 | 48 | 43 | 9 | 40 |
| *12 | 48 | 28 | 15 | 9 | 0.5 | 48 | 43 | 9 | 0 |
| 13 | 48 | 28 | 15 | 9 | 0.5 | 48 | 43 | 9 | 10 |
| 14 | 48 | 28 | 15 | 9 | 0.5 | 48 | 43 | 9 | 20 |
| 15 | 48 | 28 | 15 | 9 | 0.5 | 48 | 43 | 9 | 30 |
| 16 | 48 | 28 | 15 | 9 | 0.5 | 48 | 43 | 9 | 40 |

Table 3 shows the measurement results of the respective samples (the samples of sample numbers 9 to 16), that is, the inductance (L), the rate of change of the L value for each sample from the sample with no nonmagnetic layer formed (sample numbers 9 and 12), and the rate of change of the L value at −35° C. and 150° C. with respect to the L value at the base temperature (25° C.) ($\Delta L/L25°$ C. (%)).

It is to be noted that the samples which have sample numbers with a symbol * in Table 3 are outside the scope of the present invention.

In addition, the rate of change (%) of the L value for sample numbers 10 and 11 indicates the rate of change from sample number 9, whereas the rate of change (%) of the L value for sample numbers 13, 14, 15, and 16 indicates the rate of change from sample number 12.

TABLE 3

| Sample Number | Inductance L (μH) | Rate of Change of L value from Sample with No Nonmagnetic Layer Formed (Sample Numbers 9 and 12) | ΔL/L25° C. (%) at −35° C. | ΔL/L25° C. (%) at 150° C. |
| --- | --- | --- | --- | --- |
| *9  | 7.6 | 0   | −2 | −9 |
| *10 | 5.1 | −33 | 42 | −35 |
| *11 | 4.0 | −48 | 13 | −17 |
| *12 | 4.8 | 0   | −5 | 16 |
| 13  | 3.9 | −19 | 9  | −9 |
| 14  | 3.3 | −30 | 2  | −6 |
| 15  | 2.9 | −39 | 1  | −3 |
| 16  | 2.6 | −45 | −1 | 2  |

As shown in Table 3, it has been confirmed that, among the samples with the magnetic layers containing no $Co_3O_4$ (the samples of sample numbers 9, 10, and 11), the samples with the nonmagnetic layer formed (the samples of sample numbers 10 and 11) have temperature characteristics of inductance L significantly degraded in a negative direction.

In particular, it has been confirmed that when the thickness of the nonmagnetic layer is designed to be thin (sample number 10 (20 μm in thickness at the stage of the nonmagnetic ceramic green sheet)), the sample is significantly degraded.

This is because Ni contained in the magnetic layers is diffused to the nonmagnetic layer.

In contrast, in the case of the samples with $Co_3O_4$ added to the Ni—Zn—Cu-based ferrite material constituting the magnetic layers (the samples of sample numbers 12 to 16), since the temperature characteristics of magnetic permeability μ for the magnetic layer is positive (as shown in Table 3, it is determined that the temperature characteristics of magnetic permeability μ for the magnetic layer is also positive from the positive (+16) temperature characteristics of inductance (ΔL/L25° C. (%)) at 150° C. for the sample of sample number 12 with no nonmagnetic layer provided), it has been confirmed that in the case of having the nonmagnetic layer formed, even when Ni is diffused from the magnetic layer to the nonmagnetic layer (that is, in the case of the samples of sample numbers 13 to 16), the temperature characteristics of inductance is less likely to be degraded, and as shown in Table 3, the rate of inductance L change (ΔL/L25° C. (%)) can be suppressed within ±10% in the temperature range of −35 to 150° C.

In addition, it has been confirmed that, even when the thickness is reduced to 10 μm at the stage of the nonmagnetic ceramic green sheet, as in the case of the sample of sample number 13, an open magnetic circuit multilayer coil component can be obtained which produces a small rate of inductance L change (ΔL/L25° C. (%)).

It is to be noted that the thickness of the nonmagnetic layer was varied in the range of 10 to 40 μm in terms of the thickness at the stage of the nonmagnetic ceramic green sheet to examine characteristics, because the temperature characteristics of inductance is unfavorably increased by more than ±10% if the thickness falls below 10 μm and because the inductance is decreased significantly as compared with the case without the formation of the nonmagnetic layer, thereby resulting in damage to usefulness, if the thickness exceeds 40 μm.

It is to be noted that while a case of a multilayer inductor as the open magnetic circuit multilayer coil component has been described as an example in the example described above, the present invention is not limited to the multilayer inductor, and can be applied to noise absorption components such as multilayer impedance elements, and other various multilayer coil components.

The exemplary embodiments described above are not to be considered limiting in other respects, and various applications and variations can be made within the scope of the present invention in terms of the position and number of nonmagnetic layers to be provided, the conductor pattern for a coil, the product dimensions, the firing conditions of the laminate, and the like.

As described above, embodiments consistent with the claimed invention make it possible to provide an open magnetic circuit multilayer coil component that is less likely to cause defects between a nonmagnetic layer and a magnetic layer, causes no significant deterioration in temperature characteristics of inductance, even when the thickness of the nonmagnetic layer is reduced, and has excellent direct-current superimposition characteristics.

Embodiments consistent with the claimed invention also can have excellent direct-current superimposition characteristics.

Therefore, embodiments consistent with the claimed invention can be widely applied to open magnetic circuit multilayer coil components formed by stacking magnetic layers and coil conductors, with a nonmagnetic layer provided between the magnetic layers so as to cross a magnetic path formed within the multilayer coil component by energization of the coil.

An open magnetic circuit multilayer coil component according to an embodiment consistent with the present invention uses a nonmagnetic material composed of the Zn—Cu-based ferrite material, as a nonmagnetic material constituting the nonmagnetic layers, and uses a magnetic material containing 100 parts by weight of an Ni—Zn—Cu-based magnetic ferrite material and 0.1 to 2.0 parts by weight of Co in terms of $Co_3O_4$ with respect to the Ni—Zn—Cu-based magnetic ferrite material, as a magnetic material constituting the magnetic layers. Because of this, the difference in firing shrinkage between the magnetic layer and the nonmagnetic layer can be made small, allowing suppression of the occurrence of defects such as cracks.

In addition, the use of the ferrite material containing Co at the above-mentioned ratio with respect to the Ni—Zn—Cu-based magnetic ferrite material as a magnetic material constituting the magnetic layers can allow for rendering flat the temperature characteristics as the whole multilayer coil, even with the diffusion of Ni from the magnetic layer to the nonmagnetic layer upon firing.

Additionally, in more specific embodiments, using a magnetic material containing 100 parts by weight of the Ni—Zn—Cu-based magnetic ferrite material and 0.2 to 1.5 parts by weight of Co in terms of $Co_3O_4$ with respect to the Ni—Zn—Cu-based magnetic ferrite material as a magnetic material constituting the magnetic layers, as in the case of the open magnetic circuit multilayer coil component, allows for the temperature characteristics as the whole open magnetic circuit multilayer coil component is allowed to be rendered flat in a wider range of temperatures.

In addition, the nonmagnetic layer can be provided in some specific embodiments so as to cross a magnetic path formed within the laminate by energization of the coil, thereby allowing direct-current superimposition characteristics to be improved. In particular, with the nonmagnetic layer formed in a central region in the stacking direction of the laminate, the direct-current superimposition characteristics are allowed to be improved more efficiently, and it is thus possible to strike a balance between the temperature characteristics and the direct-current superimposition characteristics at a higher level.

In addition, the use of the ferrite material containing Co at the above-mentioned ratio with respect to the Ni—Zn—Cu-based magnetic ferrite material as a magnetic material constituting the magnetic layers allows the temperature characteristics of the magnetic permeability of the magnetic layer to be rendered positive, thereby allowing the temperature characteristics as the whole multilayer coil to be rendered flat, even with Ni diffused from the magnetic layer to the nonmagnetic layer.

Also, according to specific embodiments, with the nonmagnetic layer formed by firing a nonmagnetic ceramic green sheet with a thickness of 10 to 40 μm, the nonmagnetic layer of the product will be thin and have a thickness on the order of 5 to 20 μm. However, even in that case, it becomes possible to obtain an open magnetic circuit multilayer coil component which exhibits flat temperature characteristics of inductance and a large initial inductance.

It is to be noted that it can be preferable that the thickness of the nonmagnetic layer be rendered in the range of 10 to 40 μm at the stage of the nonmagnetic ceramic green sheet before the firing, because the temperature characteristics are unfavorably increased by more than ±10% if the thickness falls below 10 μm and because the inductance is significantly decreased unfavorably and can fall below 50% of the case without the formation of a nonmagnetic layer, if the thickness exceeds 40 μm.

It is to be noted that in the firing step, the green sheet for the nonmagnetic layer can be shrunk to about 50% of the thickness before the firing. Therefore, the sintered nonmagnetic layer has a thickness of about 5 to 20 μm, as described above. However, it is difficult to measure the thickness of the fired nonmagnetic layer, and the thickness is thus specified herein at the stage of the nonmagnetic ceramic green sheet before the firing.

In addition, in a process for producing an open magnetic circuit multilayer coil component according to embodiments consistent with the claimed invention, the open magnetic circuit multilayer coil component is produced by a so-called laminating method, and it is thus possible to produce the open magnetic circuit multilayer coil component more reliably.

In addition, with the nonmagnetic ceramic green sheet provided in a central region of the stacking direction of the unfired laminate as in the case of a more specific embodiment of a process for producing an open magnetic circuit multilayer coil component, the direct-current superimposition characteristics are allowed to be improved more efficiently, thereby allowing a solar cell coil component to be obtained with a balance struck between the temperature characteristics and the direct-current superimposition characteristics at a higher level.

While exemplary embodiments have been described above, it is to be understood that variations and modifications will be apparent to those skilled in the art without departing from the scope and spirit of the claimed invention. The scope of the invention, therefore, is to be determined solely by the following claims and their equivalents.

What is claimed is:

1. An open magnetic circuit multilayer coil component comprising:
    a laminate including a coil incorporated laminate section and an exterior section, said coil incorporated laminate section including a plurality of conductors for a coil stacked with a plurality of magnetic layers containing an Ni—Zn—Cu-based ferrite material as their main constituent, said plurality of conductors for a coil electrically connected to form a coil in the coil incorporated laminate section, and said exterior section having magnetic layers stacked on external sides of the coil incorporated laminate section in a stacking direction of the coil incorporated laminate section; and
    a nonmagnetic layer containing a Zn—Cu-based ferrite material, the nonmagnetic layer provided within the laminate so as to cross a magnetic path formed within the laminate by energization of the coil,
    wherein a magnetic material constituting the magnetic layers contains 100 parts by weight of the Ni—Zn—Cu-based ferrite material and 0.1 to 2.0 parts by weight of Co in terms of $Co_3O_4$ with respect to the Ni—Zn—Cu-based ferrite material.

2. The open magnetic circuit multilayer coil component according to claim 1, wherein the magnetic material constituting the magnetic layers contains 100 parts by weight of the Ni—Zn—Cu-based ferrite material and 0.2 to 1.5 parts by weight of Co in terms of $Co_3O_4$ with respect to the Ni—Zn—Cu-based ferrite material.

3. The open magnetic circuit multilayer coil component according to claim 2, wherein the nonmagnetic layer is provided in a central region in the stacking direction of the laminate.

4. The open magnetic circuit multilayer coil component according to claim 3, wherein the magnetic material constituting the magnetic layers has positive temperature characteristics of magnetic permeability.

5. The open magnetic circuit multilayer coil component according to claim 3, wherein the nonmagnetic layer is formed by firing a nonmagnetic ceramic green sheet, and has a thickness of 10 to 40 μm at a stage of the nonmagnetic ceramic green sheet before the firing.

6. The open magnetic circuit multilayer coil component according to claim 4, wherein the nonmagnetic layer is formed by firing a nonmagnetic ceramic green sheet, and has a thickness of 10 to 40 μm at a stage of the nonmagnetic ceramic green sheet before the firing.

7. The open magnetic circuit multilayer coil component according to claim 2, wherein the magnetic material constituting the magnetic layers has positive temperature characteristics of magnetic permeability.

8. The open magnetic circuit multilayer coil component according to claim 7, wherein the nonmagnetic layer is formed by firing a nonmagnetic ceramic green sheet, and has a thickness of 10 to 40 μm at a stage of the nonmagnetic ceramic green sheet before the firing.

9. The open magnetic circuit multilayer coil component according to claim 1, wherein the nonmagnetic layer is formed by firing a nonmagnetic ceramic green sheet, and has a thickness of 10 to 40 μm at a stage of the nonmagnetic ceramic green sheet before the firing.

10. The open magnetic circuit multilayer coil component according to claim 2, wherein the nonmagnetic layer is formed by firing a nonmagnetic ceramic green sheet, and has a thickness of 10 to 40 μm at a stage of the nonmagnetic ceramic green sheet before the firing.

11. The open magnetic circuit multilayer coil component according to claim 1, wherein the magnetic material constituting the magnetic layers has positive temperature characteristics of magnetic permeability.

12. The open magnetic circuit multilayer coil component according to claim 11, wherein the nonmagnetic layer is formed by firing a nonmagnetic ceramic green sheet, and has a thickness of 10 to 40 μm at a stage of the nonmagnetic ceramic green sheet before the firing.

13. The open magnetic circuit multilayer coil component according to claim 1, wherein the nonmagnetic layer is provided in a central region in the stacking direction of the laminate.

14. The open magnetic circuit multilayer coil component according to claim 13, wherein the magnetic material constituting the magnetic layers has positive temperature characteristics of magnetic permeability.

15. The open magnetic circuit multilayer coil component according to claim 14, wherein the nonmagnetic layer is formed by firing a nonmagnetic ceramic green sheet, and has a thickness of 10 to 40 μm at a stage of the nonmagnetic ceramic green sheet before the firing.

16. The open magnetic circuit multilayer coil component according to claim 13, wherein the nonmagnetic layer is formed by firing a nonmagnetic ceramic green sheet, and has a thickness of 10 to 40 μm at a stage of the nonmagnetic ceramic green sheet before the firing.

17. A process for producing an open magnetic circuit multilayer coil component comprising a laminate including a coil incorporated laminate section and an exterior section, said coil incorporated laminate section including a plurality of conductors for a coil stacked with a plurality of magnetic layers, said plurality of conductors for a coil electrically connected to form a coil in the coil incorporated laminate section, said exterior section having magnetic layers stacked on external sides of the coil incorporated laminate section in a stacking direction of the coil incorporated laminate section, and a nonmagnetic layer containing a Zn—Cu-based ferrite material provided within the laminate so as to cross a magnetic path formed within the laminate by energization of the coil, the process comprising the steps of:
  (a) preparing a magnetic ceramic green sheet containing a magnetic material as its main constituent, the magnetic material containing an Ni—Zn—Cu-based ferrite material and 0.1 to 2.0 parts by weight of Co in terms of $Co_3O_4$ with respect to 100 parts by weight of the Ni—Zn—Cu-based ferrite material, a coil forming magnetic ceramic green sheet with a conductor pattern for a coil formed on the magnetic ceramic green sheet, and a nonmagnetic ceramic green sheet containing a nonmagnetic material as its main constituent;
  (b) forming an unfired laminate by stacking the magnetic ceramic green sheet, the coil forming magnetic ceramic green sheet, and the nonmagnetic ceramic green sheet, the unfired laminate comprising an unfired coil incorporated laminate section in which a plurality of conductor patterns for a coil and a plurality of magnetic ceramic green sheets are stacked, the coil incorporated laminate section having therein a coil pattern formed by connecting the plurality of conductor patterns for a coil; an unfired exterior section made of magnetic ceramic green sheets provided on external sides in the stacking direction of the unfired coil incorporated laminate section; and a nonmagnetic ceramic green sheet provided so as to be sandwiched between the coil forming magnetic ceramic green sheets constituting the unfired coil incorporated laminate section;
  (c) forming a pair of external electrode patterns on the unfired laminate, said pair of external electrode patterns connected at each end of the coil pattern; and
  (d) firing the unfired laminate with the external electrode patterns formed.

18. The process for producing an open magnetic circuit multilayer coil component according to claim 17, wherein the nonmagnetic ceramic green sheet is provided in a central region in the stacking direction of the unfired laminate.

\* \* \* \* \*